United States Patent
Robertson et al.

(10) Patent No.: US 7,362,859 B1
(45) Date of Patent: Apr. 22, 2008

(54) ENHANCEMENT OF UTILIZATION OF ENCRYPTION ENGINE

(75) Inventors: Robert J. Robertson, Albuquerque, NM (US); Edward L. Witzke, Edgewood, NM (US)

(73) Assignee: Sandia Corporation, Alb, NM (US)

( * ) Notice: Subject to any disclaimer, the term of this patent is extended or adjusted under 35 U.S.C. 154(b) by 442 days.

(21) Appl. No.: 09/970,912

(22) Filed: Oct. 4, 2001

Related U.S. Application Data

(60) Provisional application No. 60/238,678, filed on Oct. 6, 2000.

(51) Int. Cl.
*H04K 1/04* (2006.01)
*H04K 1/00* (2006.01)

(52) U.S. Cl. .......................... 380/37; 380/29
(58) Field of Classification Search ................ 380/37, 380/29
See application file for complete search history.

(56) References Cited

U.S. PATENT DOCUMENTS

| | | | | |
|---|---|---|---|---|
| 4,969,190 A * | 11/1990 | Takaragi et al. | ......... | 380/43 |
| 5,432,849 A * | 7/1995 | Johnson et al. | ......... | 380/280 |
| 5,633,934 A * | 5/1997 | Hember | ......... | 713/192 |
| 5,671,283 A * | 9/1997 | Michener et al. | ......... | 713/161 |
| 5,745,577 A * | 4/1998 | Leech | ......... | 380/28 |
| 5,799,089 A * | 8/1998 | Kuhn et al. | ......... | 380/37 |
| 5,835,599 A * | 11/1998 | Buer | ......... | 380/29 |
| 6,055,316 A * | 4/2000 | Perlman et al. | ......... | 380/262 |
| 6,269,163 B1 * | 7/2001 | Rivest et al. | ......... | 380/28 |
| 6,870,929 B1 * | 3/2005 | Greene | ......... | 380/28 |
| 6,920,562 B1 * | 7/2005 | Kerr et al. | ......... | 713/189 |
| 2001/0038693 A1 * | 11/2001 | Luyster | ......... | 380/37 |

OTHER PUBLICATIONS

Bruce Schneier, 1996, Applied Cryptography , Second Edition p. 311.*
Michelle L. Hankins, Signal AFCEA's International Journal, Oct. 1999 "Integrated Circuit Chip Provides Secure, Rapid Data Encryption" pp. 1-3.*
Schaffer et al. "A flip-chip implementation of the data encryption standard (DES)" Feb. 1997, pp. 13-17.*
American National Standards Institute; Triple Data Encryption Algorithm Modes of Operation; Jul. 29, 1998; pp. 1-90.
ACM SIGCOMM, vol. 29, No. 1; ACM SIGCOMM Computer Communication Review Paper Retrieval; Jan. 1999.

* cited by examiner

*Primary Examiner*—Nasser Moazzami
*Assistant Examiner*—Eleni A Shiferaw
(74) *Attorney, Agent, or Firm*—Madelynne J. Farber

(57) ABSTRACT

A method of enhancing throughput of a pipelined encryption/decryption engine for an encryption/decryption process has a predetermined number of stages and provides feedback around the stages (and of such an encryption/decryption engine) by receiving a source datablock for a given stage and encryption/decryption context identifier; indexing according to the encryption/decryption context identifier into a bank of initial variables to retrieve an initial variable for the source datablock; and generating an output datablock from the source datablock and its corresponding initial variable.

8 Claims, 4 Drawing Sheets

$CT_1 = E(PT_1 \oplus IV_0)$
$CT_2 = E(PT_2 \oplus IV_1)$
$CT_3 = E(PT_3 \oplus IV_2)$
.
.
.
$CT_M = E(PT_M \oplus IV_{M-1})$
.
.
.
$CT_{18} = E(PT_{18} \oplus IV_{17})$
$CT_{19} = E(PT_{19} \oplus CT_1)$
$CT_{20} = E(PT_{20} \oplus CT_2)$
.
.
.
$CT_N = E(PT_N \oplus CT_{N-18})$ $CT_{1(VC1)} = E(PT_{1(VC1)} \oplus IV_{(VC1)})$
$CT_{1(VC2)} = E(PT_{1(VC2)} \oplus IV_{(VC2)})$
.
.
.
$CT_{1(VCN)} = E(PT_{1(VCN)} \oplus IV_{(VCN)})$
$CT_{2(VC1)} = E(PT_{2(VC1)} \oplus CT_{1(VC1)})$
.
.
.
$CT_{2(VCN)} = E(PT_{2(VCN)} \oplus CT_{1(VCN)})$
.
.
.
$CT_{M(VCN)} = E(PT_{M(VCN)} \oplus CT_{M-1(VCN)})$

ENHANCEMENT OF UTILIZATION OF ENCRYPTION ENGINE

This application claims the benefit of the filing of U.S. Provisional Patent Application Ser. No. 60/238,678, entitled Encryptor, filed on Oct. 6, 2000, and the specification thereof is incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

The present invention relates to encryption engines.

A traditional encryption engine utilizing Electronic Code Book (ECB) mode of encryption processes a block of data on every clock cycle. The encryption process can thus be pipelined (broken into smaller sequential functions) for increased throughput. However, ECB mode is rarely used in practice because it is vulnerable to certain attacks because identical plaintext blocks produce identical ciphertext blocks.

Cipher Block Chaining (CBC) mode is the preferred mode in practice because CBC mode encryption requires feedback from the previous computation. The CBC mode of encryption is, therefore, difficult to pipeline because each subsequent block of data requires the results of the encryption of the previous block of data.

The present invention provides solutions to the problem of keeping an encryption engine (such as those employing the Data Encryption Standard (DES) or other encryption algorithm) pipeline full so that the encryption engine can run at full capacity in CBC mode. The traditional concern with CBC mode encryption using pipelined implementations is that the pipeline must be "flushed" or "run dry" before a ciphertext value is obtained and fed back to Exclusively-OR with the next block of plaintext. In the prior art, a single engine only processes data from a single stream at any one time. The present invention allows the encryption engine pipeline to be kept full, thus permitting full-rate operation.

The prior art includes ANSI Standard X9.52, Triple-DES Cipher Block Chaining—Interleaved Mode (TCBC-I), approved Jul. 29, 1998, and published by the American Bankers Association. In that standard there are three encryptors/decryptors operating in parallel, each performing one encryption/decryption per clock cycle. These are not pipelined encryptors, where each encryptor stage requires a clock cycle, but performs much less work. Rather, these use a slower clock and perform all the work in a combinatorial fashion during one clock cycle. The results from one encryptor are pipelined to the next, but the individual encryptors are not pipelined. (See especially chapter 7). The referenced X9.52 standard specifies 3 input sub-streams (one stream triparted, not 3 different streams) and 3 stages of encryption. Because some of the modern encryptors have each of the 3 portions (encrypt-decrypt-encrypt) subdivided into 18 or more stages, the method of X9.52 is insufficient to keep a 54 (or more) stage encryptor fully fed. Using a 54 stage encryptor and the method of X9.52 would produce 3 results in quick succession, then would stall for 51 clock cycles before the next 3 results come forth.

SUMMARY OF THE INVENTION

The method described herein assumes not a number of input queues (plaintext streams or sub-streams) fixed by the method, but rather that the number of input queues is equal to or greater than the number of encryptor stages in the particular encryptor implementation. The plaintext input streams to fill these queues can come from many different sources or be sub-parts of one or a few sources, or a combination of both.

Modes of encryption other than CBC can benefit from the present invention, particularly any requiring feedback from a previous computation. For a discussion of modes of encryption, see *DES Modes of Operation* (FIPS PUB 81), Federal Information Processing Standards Publication 81, U.S. National Bureau of Standards, Washington, D.C. (December 1980). See, also, the referenced standard ANS X9.52-1998.

The present invention is of a method of enhancing throughput of a pipelined encryption/decryption engine for an encryption/decryption process comprising a predetermined number of stages and providing feedback around the stages (and of such an encryption/decryption engine), comprising: receiving a source datablock for a given stage and encryption/decryption context identifier; indexing according to the encryption/decryption context identifier into a bank of initial variables to retrieve an initial variable for the source datablock, the bank comprising a plurality of initial variables for each encryption/decryption context identifier; and generating an output datablock from the source datablock and its corresponding initial variable.

The invention is also of a method of enhancing throughput of a pipelined encryption/decryption engine for an encryption/decryption process comprising a predetermined number of stages and providing feedback around the stages (and of such an encryption/decryption engine), comprising: for each of a plurality of encryption/decryption contexts, a number of which equals or exceeds the predetermined number of stages, receiving a source datablock for the corresponding encryption context identifier; for each of the plurality of encryption/decryption contexts, indexing according to the encryption/decryption context identifier into a bank of variables comprising initial variables and prior-stage output datablocks to retrieve a seed variable for the source datablock; and for each of the plurality of encryption/decryption contexts, generating an output datablock from the source datablock and its corresponding seed variable; wherein each stage of the pipelined encryption/decryption engine at any given time is processing source datablocks from an encryption/decryption context different than encryption/decryption contexts of source datablocks being processed in all other stages of the pipelined encryption/decryption engine. In the preferred embodiment, each of the plurality of encryption/decryption contexts comprises a telecommunications data stream to be encrypted, and the output datablocks are decrypted at a plurality of locations distributed from the encryption/decryption engine corresponding in number to the number of encryption/decryption contexts. The encryption/decryption process is preferably Cipher Block Chaining Mode.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

The present invention provides a method of and means for keeping an encryption engine (such as those employing the Data Encryption Standard (DES) or other block encryption algorithm) pipeline full so that the encryption engine can run at full capacity in CBC mode, or in other encryption modes requiring feedback from a previous computation.

Figure 1:
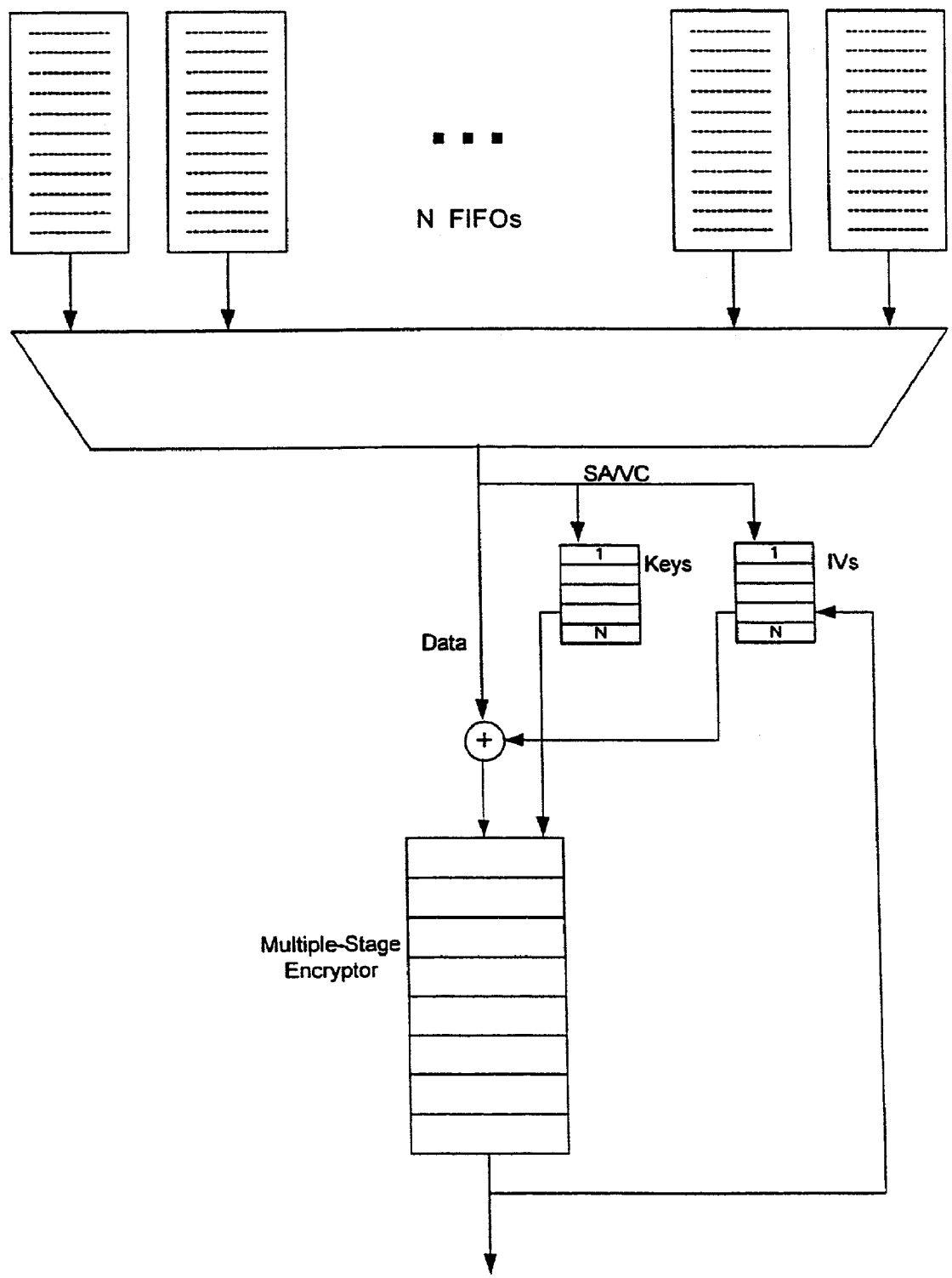
FIG. 1 is a block diagram of the preferred embodiment of the invention.

In the preferred embodiment of the invention, referring to FIG. 1, as data blocks from various sources enter the encryption engine, their virtual circuit (VC) or security association (SA) identifier (or other standard identifier of "encryption context") is used to index into a bank of keys and initial variables (IVs) or the results of the previous encryption for this data stream (VC or SA). This information is then passed to the encryption engine along with the data block for processing.

Figure 2:
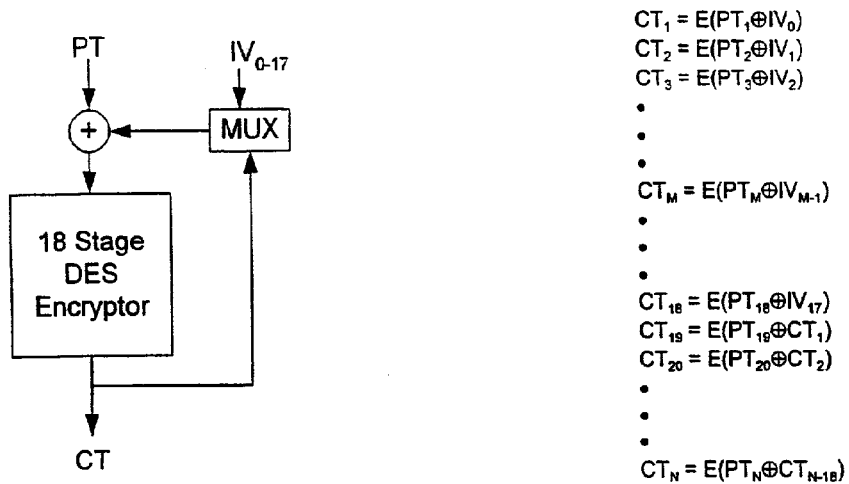
FIG. 2 is a block diagram of a first variant of the preferred embodiment.

A first variant uses multiple IVs, the IVs being used to seed the encryption function for encryption of the first block of plaintext. There is one IV per stage of the encryptor/decryptor to seed the encryption function. Referring to FIG. 2, if there are 18 stages to a particular encryptor, such as that for the Sandia National Laboratories DES ASIC. (See D. Craig Wilcox, Lyndon G. Pierson, Perry J. Robertson, Edward L. Witzke, and Karl Gass, A DES ASIC Suitable for Network Encryption at 10 Gbps and Beyond, in Cryptographic Hardware and Embedded Systems, Vol. 1717 of Lecture Notes in Computer Science, held in Worcester, Mass., Aug. 12-13, 1999. Springer-Verlag, Berlin, 1999.), then 18 IVs are required. If there are 50 stages (such as for a Triple-DES implementation using only one initial-final permutation pair), then 50 IVs would be needed. In order to keep a pipelined encryptor from stalling and having to wait for blocks to be flushed through it, there must be as many IVs as there are pipeline stages.

This variant must start with N IVs (where N is the number of individually clocked stages of the encryption algorithm) instead of only one IV as in traditional CBC mode encryption/decryption. It also needs N times 64 (or in general, the length of the IV/ciphertext/plaintext blocks) bits for storage of IVs; subsequent IVs are consumed as soon as they are generated.

The method of this variant will not interoperate between encryption engine implementations containing differing number of clocked stages. It also will not interoperate with traditional CBC mode as specified in FIPS PUB 81, supra. In the FIPS PUB 81 specification of CBC mode, each block fed into the encryptor is related to the ciphertext of the previous blocks, with the exception of the first, which is related to the IV. In this variant of the invention, the N IVs are preferably unrelated. Because there are N stages seeded by N independent IVs, this results in block 2N+1 being related to block N+1, which is related to block 1, and in block 2N+2 being related to block N+2, which is related to block 2, and so forth. In other words, rather than each block being related to the previous, every Nth block is related. Note that in a traditional CBC mode encryptor of one stage (N=1), each block would be related to the previous block.

Figure 3:
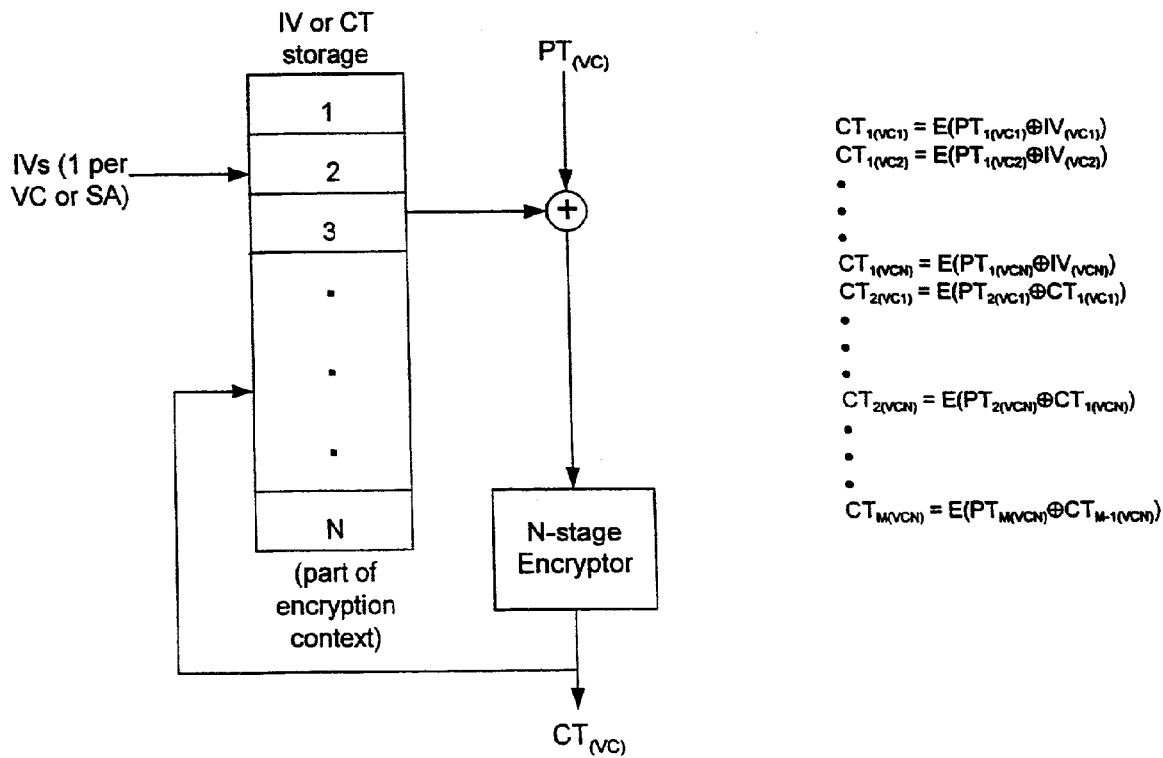
FIG. 3 is a block diagram of a second variant of the preferred embodiment.

The second variant of the preferred embodiment also uses multiple IVs, but uses one per encryption context. In this variant, each SA or VC that is being fed through the encryption/decryption engine has its own encryption context. Along with key material, this encryption context includes an IV or the previous ciphertext block for that SA or VC, as shown in FIG. 3.

The ciphertext throughput for any one VC or SA in the second variant will still only be (full rate)/N, but aggregate throughput will be at full rate if there are at least N active VCs or SAs. It is necessary to keep the encryption engine "fully stoked" so that it can run at full rate, even if each VC or SA is only getting a fraction of the encryption throughput. This variant is interoperable with the traditional CBC set forth in FIPS PUB 81, because each block is related to the previous block of its SA or VC.

In Asynchronous Transfer Mode (ATM) communications, one can break up the data stream into N separate VCs (one for each clocked stage of the encryption engine), and one would incur N call setup overheads but get full rate encryptor/decryptor throughput. However, note that block N+1 would be related to block 1, not to block N, etc. This would not permit the encryption implementation to interoperate with a traditional CBC implementation at the other end of the communication link.

If the pipelined encryption engine is viewed as a collection of resources, where each "resource" is one stage of the pipeline, with the associated data and key, then these "resources" can be allocated to incoming data packets or blocks from various communication sessions. As long as there are significantly more sessions generating communication packets and requesting communication services for them than there are clocked stages of the encryption pipeline, then the engine will run at full rate, without stalling to flush the pipeline.

Figure 4:
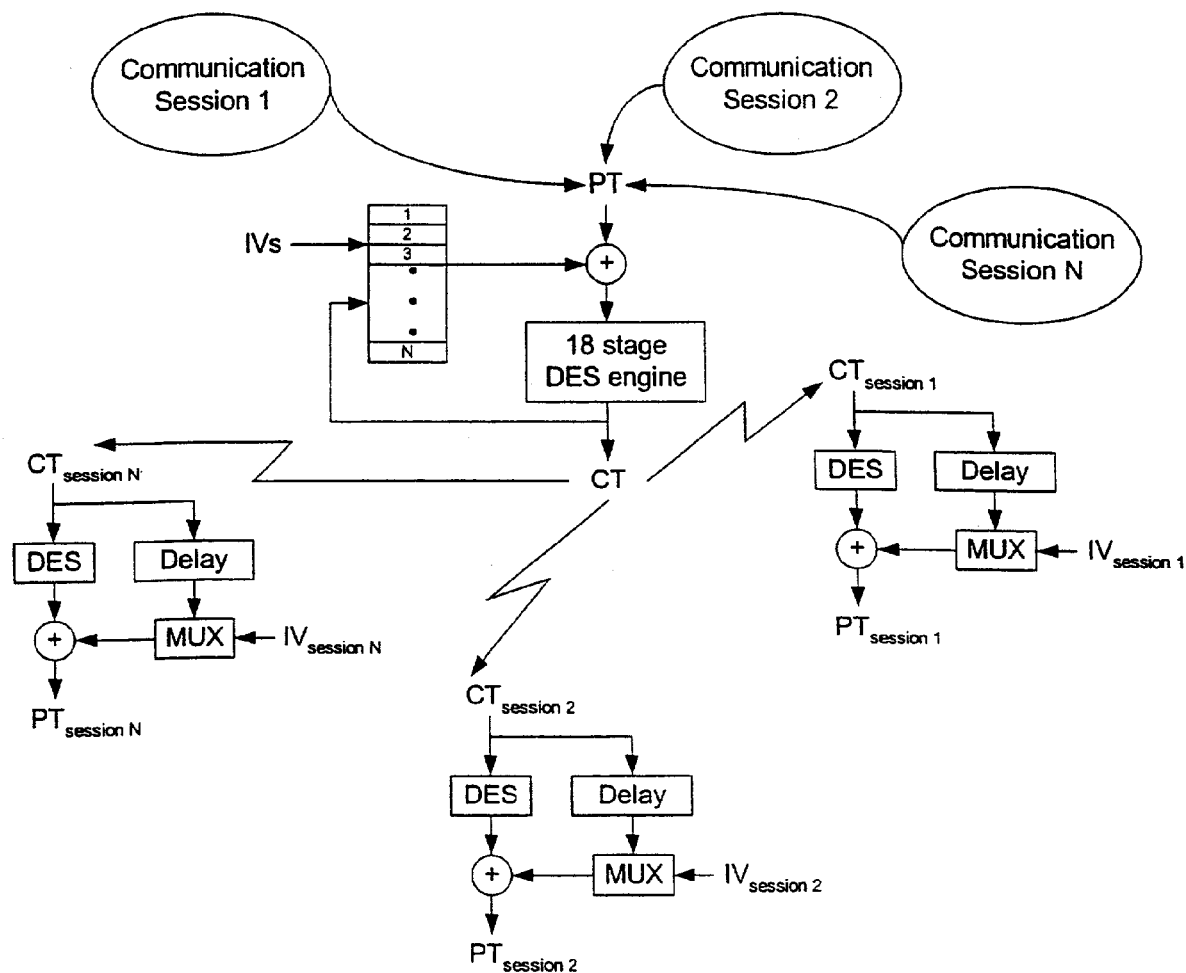
FIG. 4 is a block diagram of an application of the second variant in which encryption is done according to the invention and decryption is done either according to the invention or according to prior art devices.

FIG. 4 shows multiple encryption sessions aggregated through one pipelined encryptor (in this Q example, single DES, CBC mode) to individual, conventional (non-pipelined) DES decryptors operating in CBC mode. This is useful where many users are sharing a computing resource (or a set of computing resources) connected to a high-performance communication line that uses a single, key-agile, high-performance encryptor. After the encrypted data travels through the network and goes through switching equipment and rate adaptation, it can arrive at a smaller computing resource (e.g., workstation) at a slower data rate. This would enable the use of slower, simpler (non-pipelined), and less expensive decryptors at the workstations. In this way the high-performance CBC mode encryptor at the large computing resource can interoperate with the cheaper decryptors used with the smaller resources. As next shown in FIG. 5, this kind of encryptor can still pass data from the type of encryptor described in the first variant of the preferred embodiment in addition to data destined for conventional CBC mode encryptors.

Figure 5:
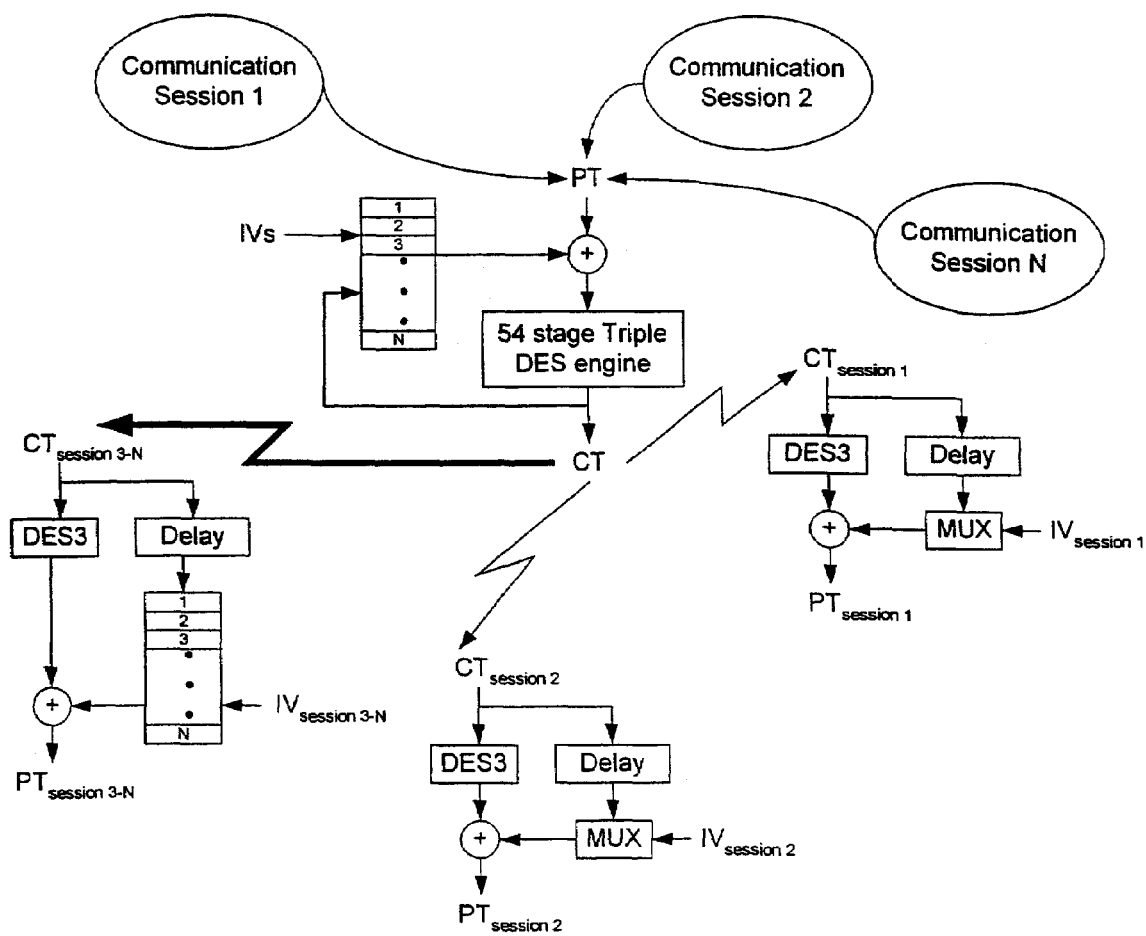
FIG. 5 is a block diagram of an application combining the first and second variants.

FIG. 5 shows multiple encryption sessions aggregated through one pipelined encryptor, but one session is separated into numerous sub-sessions, in the manner of the first variant of the preferred embodiment. In this example, a 54-stage Triple-DES engine is used in the Cipher *Block Chaining, External Feedback mode of operation, see ANS X*9.52-1998, supra, TCBC mode. The encryptor and decryptors do not care whether the blocks are coming from many sessions (each generating a low volume of data) or one session (generating a large volume of data) separated into sub-sessions for performance reasons. Each session's (or sub-session's) data, key, and IV or previous ciphertext are treated as a "client" requiring a resource. The processes (whether software or hardware) at the source and destination ends (outside the scope of the encryptors/decryptors) determine whether the session data should be divided into/combined from multiple sessions or left as a single session. The encryptors and decryptors merely deal with one key and one IV per session, although in the case of multiple sessions from a data source (referred to earlier as sub-sessions), those keys may be identical to each other. This preserves interoperability between aggregate encryptors-scattering decryptors, aggregate encryptors-conventional decryptors, and conventional encryptors-scattering decryptors, as long as the system designers and users keep the number of sessions that a data source generates and a data sink consumes consistent at each end of the communication path.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of enhancing throughput of a multi-stage pipelined encryption/decryption engine for an encryption/decryption process when used with an encryption/decryption mode of operation requiring feedback around the pipelined engine, the method comprising steps of:

aggregating together multiple security contexts and establishing an entry in a bank of initial variables for each context, there being at least as many encryption/decryption security context identifiers as a predetermined number of stages in the encryption/decryption process;

receiving, for input to the multi-stage pipelined encryption/decryption engine, a source datablock for a given encryption/decryption security context identifier;

indexing according to the encryption/decryption security context identifier into the bank of initial variables to retrieve an initial variable for the source datablock, the bank comprising a plurality of initial variables for each encryption/decryption security context identifier;

generating an output datablock from the source datablock and its corresponding initial variable;

replacing the initial variable in the bank of initial variables with a new seed, as determined by a selected mode of operation, for the security context identifier; and wherein the mode of operation of the encryption/decryption process requires feedback around the encryption/decryption engine; and wherein the pipelined encryption/decryption engine is Cipher Block Chaining Mode with exception of handling of initial variables.

2. The method of claim 1 wherein the encryption/decryption process comprises a block cipher capable of being pipelined and the encryption/decryption process is Digital Encryption Standard (DES).

3. A multi-stage pipelined encryption engine for an encryption/decryption process when used with an encryption/decryption mode of operation requiring feedback around the stages, the encryption/decryption engine comprising:

means for aggregating together multiple security contexts and establishing an entry in a bank of initial variables for each context, there being at least as many encryption/decryption security context identifiers as a predetermined number of stages in the encryption/decryption process;

means for receiving, for input to the multi-stage pipelined encryption/decryption engine, a source datablock for a given encryption/decryption security context identifier, there being at least as many encryption/decryption security context identifiers as the predetermined number of stages in the encryption/decryption process;

means for indexing according to the encryption/decryption security context identifier into a bank of initial variables to retrieve an initial variable for the source datablock, the bank comprising a plurality of initial variables for each encryption/decryption security context identifier;

means for generating an output datablock from the source datablock and its corresponding initial variable;

means for replacing the initial variable in the bank of initial variables with a new seed, as determined by a selected mode of operation, for the security context identifier; and wherein the mode of operation of the encryption/decryption process requires feedback around the encryption/decryption engine; and wherein the pipelined encryption/decryption engine is Cipher Block Chaining Mode with exception of handling of initial variables.

4. The encryption/decryption engine of claim 3 wherein the encryption/decryption process comprises a block cipher capable of being pipelined and the encryption/decryption process is Digital Encryption Standard (DES).

5. A method of enhancing throughput of a multi-stage pipelined encryption/decryption engine for an encryption/decryption process when used with an encryption/decryption mode of operation requiring feedback around the pipelined engine, the method comprising steps of:

separating one data stream into multiple interleaved data streams, each having its own encryption/decryption security context;

aggregating together the multiple security contexts and establishing an entry in a bank of initial variables for each context, there being at least as many encryption/decryption security context identifiers as a predetermined number of stages in the encryption/decryption process;

receiving, for input to the multi-stage pipelined encryption/decryption engine, a source datablock for a given encryption/decryption security context identifier;

indexing according to the encryption/decryption security context identifier into the bank of initial variables to retrieve an initial variable for the source datablock, the bank comprising a plurality of initial variables for each encryption/decryption security context identifier;

generating an output datablock from the source datablock and its corresponding initial variable;

replacing the initial variable in the bank of initial variables with a new seed, as determined by a selected mode of operation, for the security context identifier; and wherein the mode of operation of the encryption/decryption process requires feedback around the encryption/decryption engine; and wherein the pipelined encryption/decryption engine is Cipher Block Chaining Mode with exception of handling of initial variables.

6. The method of claim 5 wherein the encryption/decryption process comprises a block cipher capable of being pipelined and the encryption/decryption process is Digital Encryption Standard (DES).

7. A multi-stage pipelined encryption engine for an encryption/decryption process when used with an encryption/decryption mode of operation requiring feedback around the stages, the encryption/decryption engine comprising:

means for separating one data stream into multiple interleaved data streams, each having its own encryption/decryption security context;

means for aggregating together the multiple security contexts and establishing an entry in a bank of initial variables for each context, there being at least as many encryption/decryption security context identifiers as a predetermined number of stages in the encryption/decryption process;

means for receiving, for input to the multi-stage pipelined encryption/decryption engine, a source datablock for a given encryption/decryption security context identifier, there being at least as many encryption/decryption security context identifiers as the predetermined number of stages in the encryption/decryption process;

means for indexing according to the encryption/decryption security context identifier into a bank of initial variables to retrieve an initial variable for the source datablock, the bank comprising a plurality of initial variables for each encryption/decryption security context identifier;

means for generating an output datablock from the source datablock and its corresponding initial variable;

means for replacing the initial variable in the bank of initial variables with a new seed, as determined by a selected mode of operation, for the security context identifier; and wherein the mode of operation of the encryption/decryption process requires feedback around the encryption/decryption engine; and wherein the pipelined encryption/decryption engine is Cipher Block Chaining Mode with exception of handling of initial variables.

8. The encryption/decryption engine of claim 7 wherein the encryption/decryption process comprises a block cipher capable of being pipeline and the encryption/decryption process is Digital Encryption Standard (DES).

* * * * *

UNITED STATES PATENT AND TRADEMARK OFFICE
CERTIFICATE OF CORRECTION

| | | |
|---|---|---|
| PATENT NO. | : 7,362,859 B1 | Page 1 of 1 |
| APPLICATION NO. | : 09/970912 | |
| DATED | : April 22, 2008 | |
| INVENTOR(S) | : Perry J. Robertson and Edward L. Witzke | |

It is certified that error appears in the above-identified patent and that said Letters Patent is hereby corrected as shown below:

On the title page item (75), "Robert J. Robertson" should read -- Perry J. Robertson --

Signed and Sealed this

Twenty-seventh Day of January, 2009

JOHN DOLL
*Acting Director of the United States Patent and Trademark Office*